US006886618B2

(12) United States Patent
Foucht et al.

(10) Patent No.: US 6,886,618 B2
(45) Date of Patent: May 3, 2005

(54) SYSTEM FOR CATALYZATION OF THERMOSET RESIN ADHESIVES FOR WOOD COMPOSITES USING COMPUTERIZED IN-LINE METERING AND MIXING EQUIPMENT

(75) Inventors: Millard E. Foucht, Stone Mountain, GA (US); Robert A. Breyer, Tucker, GA (US)

(73) Assignee: Georgia-Pacific Resins, Inc., Atlanta, GA (US)

( * ) Notice: Subject to any disclaimer, the term of this patent is extended or adjusted under 35 U.S.C. 154(b) by 0 days.

(21) Appl. No.: 10/452,127

(22) Filed: Jun. 3, 2003

(65) Prior Publication Data

US 2003/0205330 A1 Nov. 6, 2003

Related U.S. Application Data

(63) Continuation-in-part of application No. 09/528,509, filed on Mar. 17, 2000, now Pat. No. 6,607,619.

(51) Int. Cl.[7] .......... B27N 3/06; B27L 5/00; B32B 21/02; B32B 21/13

(52) U.S. Cl. .......... 156/351; 156/356; 156/363; 156/367; 425/135; 425/166; 118/666; 118/708; 118/712

(58) Field of Search .......... 156/351, 356, 156/360, 363, 367; 425/135, 140, 148, 166; 264/128; 118/664–666, 708, 712

(56) References Cited

U.S. PATENT DOCUMENTS 3,979,492 A 9/1976 Sundie et al.
4,961,795 A 10/1990 Detlefsen et al.

OTHER PUBLICATIONS

Mel Foucht, Using Process Feedback Variables to Control the Addition of Resin Additives, 36th International Wood Composite Materials Symposium Proceedings, Apr. 9–11, 2002, pp. 35–39, Georgia–Pacific Resins, Inc., Decatur, Georgia.

*Primary Examiner*—Sam Chuan Yao
(74) *Attorney, Agent, or Firm*—Banner & Witcoff, LTD

(57) ABSTRACT

The present invention provides a process and system for the manufacture of wood-based composites that implement feedback adjusted in-line addition of a curing accelerator/catalyst to a thermosetting resin adhesive based on at least one of: present moisture content of the wood substrate being bonded and the temperature of the wood substrate being bonded. The method includes: measuring the flow rate of a flowing stream of resin adhesive; measuring the flow rate of a flowing stream of accelerator/catalyst; mixing the flowing stream of accelerator/catalyst and the flowing stream of resin adhesive to form a mixed catalyzed resin adhesive in a proportion of resin adhesive and accelerator/catalyst determined by said flow rates; applying the mixed catalyzed resin adhesive to the wood substrate in an application area; measuring a present moisture content and a present temperature of the wood substrate prior to applying the mixed catalyzed resin adhesive thereto; varying on a continuous basis, the proportion of the accelerator/catalyst and resin adhesive in the mixed catalyzed resin adhesive in accordance with at least one of the present moisture content and the present temperature and bonding together said wood substrate to form said wood-based composite.

9 Claims, 4 Drawing Sheets

SYSTEM FOR CATALYZATION OF THERMOSET RESIN ADHESIVES FOR WOOD COMPOSITES USING COMPUTERIZED IN-LINE METERING AND MIXING EQUIPMENT

CROSS-REFERENCES TO RELATED APPLICATIONS

This application is a continuation-in-part of the U.S. patent application titled "Catalyzation of Thermoset Resin Adhesives for Wood Composites Using Computerized In-Line Metering and Mixing Equipment," filed on Mar. 17, 2000 and having Ser. No. 09/528,509, now U.S. Pat. No. 6,607,619.

FIELD OF THE INVENTION

The present invention relates generally to a system for bonding lignocellulosic materials such as in the manufacture of plywood, laminated veneer lumber (LVL), hardboard, particleboard, fiberboard, oriented strandboard (OSB), waferboard, and the like. More particularly, the system provides for varying the level of catalyst blended into the resin used for bonding the lignocellulosic material based upon at least one of the temperature and moisture content of the lignocellulosic material (wood substrates).

BACKGROUND OF THE INVENTION

Conventional wood-based composite products are generally made using thermosetting or heat-curing resin or adhesive to bind the lignocellulosic material (wood substrate) together. The resin-binder systems generally include phenol-formaldehyde, urea-formaldehyde, melamine-formaldehyde and isocyanate. Phenol-formaldehyde (PF) resins are generally used in the manufacture of products that require durability with respect to exterior exposure, such as plywood, OSB and siding. Such resins require a longer press time and higher press temperature than do products made with urea-formaldehyde resins. Products made using phenol-formaldehyde resin thus have a slower thermal cure, which may be lengthened due to the need to eliminate moisture from the wood substrate during curing. It is known that the curing time may be shortened by the use of additives such as organic or inorganic acids or hexamethylenetetramine, but the additives may cause side effects that are undesirable. The longer press time and higher temperature needed for proper curing result in higher energy consumption and lower line speeds, causing a lower production rate. When phenol-formaldehyde resins are used to make products, the products may have a lowered dimensional stability as a result of a lower moisture content in the finished product. Also, since products manufactured with phenol-formaldehyde resin may tend to be dark in color, such products may be unsuitable for decorative applications such as furniture.

Plywood is a flat panel containing sheets of veneer called plies. Thus, plies are individual sheets of veneer in a panel. The plies are bonded using heat, pressure and a bonding agent to create a panel with an adhesive bond between the plies. Plywood may be made from hardwood, softwood, or a combination of both. Generally, plywood is constructed with an odd number of layers, with each layer having a grain perpendicular to the grain of the previous layer. Layers may be a single ply or a plurality of plies that are laminated such that their grain is parallel. The inner plies are called cores or centers. The outside plies are generally called faces. The inner plies may vary as to number, thickness, species and grade of wood and generally have a panel thickness of 8 mm to 45 mm. Thus, a panel may have an odd or even number of plies, but normally will always have an odd number of layers, i.e., the number of layers is determined by the number of times the grain orientation changes, and the outer layers generally have their grain direction oriented parallel to the length of a panel, while the inner layers generally have their grain direction oriented perpendicular to the length of the panel. Hence, a panel may be described as, for example, four ply, three layer. Alternating grain directions for adjacent plies provides dimensional stability across the width and axial strength in a direction perpendicular to the panel plane. Lamination provides for distribution of defects and minimizes splitting propensity.

Two classes of plywood are generally produced: construction and industrial, and hardwood and decorative. The construction and industrial plywood may include hardwood, and is classified by exposure capability and grade, where exposure capability may be exterior or interior. Exterior capability plywood may not have less than "C" grade veneer, as determined in Product Standard 1, an industrial standard known to those skilled in the art. Interior capability plywood may be "D" grade veneer. Hardwood and decorative plywood may include certain decorative softwood species for non-construction use, but generally includes four types of plywood, listed here in decreasing order of resistance to water: Technical (Exterior), Type I (Exterior), Type II (Interior), and Type III (Interior). The adhesives used in the manufacture of the two classes of plywood are generally different, but are selected to achieve the desired specifications of the end-product wood composite.

After the trees are felled and cut into logs, the logs are graded and sorted to provide the most efficient use of the timber. Lower grade logs may be graded as "peelers", and higher grade logs may be graded as "sawlogs". High grade peelers and high grade sawlogs are sent to sawmills. The lower grade peelers and lower grade sawlogs are sent to the veneer mills to make plywood. At the veneer mill, the logs are sorted by grade and species, then debarked and cross cut into peeler blocks. The peeler blocks may be heated, steamed, or immersed in hot water prior to peeling to facilitate peeling and provide better quality veneer material. The peeler blocks are then transferred to a veneer lathe where the blocks are rotated at high speed and are fed against a stationary knife parallel to the length of the block until a predetermined size core remains. The core may be sawed into lumber, sold as fenceposts or timber or chipped to provide wood chips. Thus, veneer is peeled from the block as a continuous, uniform, thin sheet. Veneer typically is 0.8 mm to 4.8 mm thick.

The continuous sheet of veneer is then cut into usable widths; defects are removed; and the veneer may be dried to a moisture content that is compatible with the adhesive being used to bind the panels. Glue may be applied to a panel by any known method such as spraying, curtain coating, roller coating, extrusion, or foaming. Adhesive may applied to one surface by spraying, curtain coating or foaming, or may be applied to two surfaces by using a roll-coater. Typically, after being coated with adhesive, the core plies are "laid up" to form desired panels and then conveyed from the lay-up area to the pressing area. Generally, the panels are cold pressed to flatten the veneers and transfer the adhesive to uncoated sheets, followed by hot pressing to cure the adhesive. Then panels are solid-piled (hot-stacked) to allow the adhesive to complete cure. Then panels may be sawed to a desired size, sanded where desired, and then graded.

Generally, in part due to their light color, urea-formaldehyde (UF) resins are used for manufacturing interior or decorative products. Products prepared using urea-formaldehyde resins tend to have a smooth surface and uniform dimensions. Curing for such products is generally accomplished at a temperature similar to PF plywood resins, but lower than PF OSB resins, and press times are generally shorter. Due to the cost of raw materials and processing, urea-formaldehyde resins are more economical than phenol-formaldehyde resins to use for manufacturing composite wood products.

Since melamine-formaldehyde (MUF) resins are generally more expensive than phenol-formaldehyde resins, melamine-formaldehyde resins are typically blended with urea-formaldehyde resins and utilized for wood composites used for decorative applications.

Diphenylmethane di-isocyanate often is used to manufacture composite wood products such as OSB. However, the highly toxic nature of the isocyanate requires that special safety precautionary measures be implemented in the manufacturing process.

Clearly, selection of adhesives in the manufacture of composite wood products requires consideration of a number of factors such as, for example, the total costs to be incurred, the materials to be bonded, the moisture content at the time of bonding, and the desired properties and durability of the products to be manufactured. Generally, phenol-formaldehyde and urea-formaldehyde are the most commonly used adhesives for lignocellulosic, i.e., wood-fiber, composite products.

A number of products contain particle and fiber composite materials. OSB and waferboard are made by flaking or chipping roundwood. Fiberboard is made by reducing chips to wood fiber wherein steam is usually used to soften the wood. After softening, the wood is partially dried, adhesive is added, and a mat of strands, particles, and fibers is produced. A platen-type press is used to press the mat using heat and pressure to cure the adhesive. The bonded mat is then cooled and cut into desired sizes.

Fiberboard includes hardboard, medium density fiberboard (MDF) and insulation board. Fiberboard may be manufactured by attrition milling, in which the wood is fed between a rotating disk and a stationary disk. As the wood is fed between the disks, it is forced into fibers and groups of fibers. This process may be enhanced by, prior to attrition milling, soaking the wood in water, steaming the wood, or chemically treating the wood. Fiberboard, may be made by a wet or dry process, but, due to having longer fibers of wood than particleboard, tends to be a stronger product than particleboard. In the wet process, the fibers are mixed with water to form a pulp, which is then placed on a continuously moving screen or on cylinder formers. This process removes some of the water, and the resulting mat is put through press rolls to remove excess water. Steam-heated presses are used to further process the fiberboard. The fiberboard may then be dry heated to improve the resin bonding. Also, oil may be added to provide protection from moisture. Alternatively, the fiberboard may be continuously or progressively humidified to increase the moisture content from about zero after pressing, to about three to seven percent moisture.

Waferboard was originally manufactured from aspen wood strands that were bonded together with resin using heat and pressure. As demand increased, waferboard production evolved into production of a related product, OSB (Oriented StrandBoard). The OSB includes woods other than aspen, including small amounts of certain hardwoods. OSB is manufactured from long, thin wood strands that are bonded together into mats with waterproof resin and in some instances wax, placed in a perpendicular orientation in adjacent layers as described above for plywood, and pressed using heat. Typically, logs are debarked, then may be soaked or sent directly to be processed into strands. Generally, if the wood is green, the strands may be stored in moist bins prior to drying. After drying, the strands are blended with adhesive and wax, wherein the mat face and the core mat each have different resin formulations based on the desired end product. Since OSB is generally configured in layer mats consisting of a mat face, a core mat and another mat face, the mat faces typically have the wood strands oriented parallel to the length of the board, and the core mat has the wood strands oriented perpendicular to the length of the board. The layer mats are hot pressed to cure the resin.

In order to avoid waste of leftover materials such as sawdust and trimmings of wood products, the product particleboard evolved. The leftover materials were first reduced to small particles, adhesive was applied, a mat was formed, and heat and pressure were applied to the mat to provide a panel product. Mats typically have a moisture content of eight percent to twelve percent prior to being pressed and generally have a moisture content of approximately five percent to nine percent after pressing. Particleboard may have a resin content of four percent to ten percent, but particleboard made with UF resins typically has a resin content of six percent to nine percent. For interior use particleboard, UF resin is generally used for the adhesive. However, to provide a moisture-resistant particleboard, PF and MF resins are sometimes used. It should be noted that particleboard may also be made by an extrusion process wherein the particles are forced between two platens of a heated die, and the particleboard is extruded between the platens. Since the particles are typically aligned perpendicularly to the plane of the particleboard, the particleboard made by extrusion generally has properties different from the properties of particleboard made by hot pressing into panels.

Since wood differs widely between species and since moisture uptakes by different species may vary during processing, moisture variations may occur as well as temperature variations, making uniformity, consistency and predictability for a composite product difficult to obtain. Since the substrate temperature and moisture content of the composite product are essential to produce a reliably consistent adhesively bonded product, there is a need for a system for maintaining application of a catalyzed thermoset adhesive using a feedback process that permits variation of the level of catalyst blended in the resin based on the variation of at least one of the temperature and the moisture content of the lignocellulosic material (wood substrate).

SUMMARY OF THE INVENTION

The present invention modifies present wood composite manufacturing practices by providing dynamic feedback adjustment of addition of curing accelerator (alternatively referred to as a catalyst) to a thermosetting resin adhesive used for bonding wood substrate based on a real-time measure of present moisture content and/or a real-time measure of present temperature of the wood substrate being processed. The process of the present invention adjusts the amount of in-line addition of a curing accelerator/catalyst to the thermosetting resin adhesive and includes the steps of: measuring the flow rate of a flowing stream of resin adhesive; measuring the flow rate of a flowing stream of accelerator/catalyst; mixing the flowing stream of accelerator/catalyst and the flowing stream of resin adhesive to form a mixed catalyzed resin adhesive in a proportion of resin adhesive and accelerator/catalyst determined by said flow rates; applying the mixed catalyzed resin adhesive to the wood substrate in an application area; measuring a present moisture content and a present temperature of the wood substrate prior to applying the mixed catalyzed resin adhesive thereto; varying on a continuous basis, the proportion of the accelerator/catalyst and resin adhesive in the mixed catalyzed resin adhesive in accordance with (as a function of) the measuring of at least one of the present moisture content and the present temperature and bonding together said wood substrate to form a wood-based composite.

Typically, the wood-based composite may be plywood, laminated veneer lumber (LVL), hardboard, particleboard, fiberboard, oriented strandboard (OSB), waferboard, parallel-laminated veneer, a laminated beam, an overlaid material, a wood-nonwood composite, a cellulosic fiberboard, flakeboard, or an edge-glued wood-based composite material.

A plurality of examples in accordance with the present invention showing various accelerant/catalyst proportions by weight per weight of resin that were determined based on various temperature and/or moisture contents of the wood substrates are described below.

The invention is directed to a system that provides feedback adjusted in-line addition of a curing accelerator/catalyst to a thermosetting resin adhesive used to adhesively bond wood substrates to form a wood-based composite. The invention uses a measured value of either, or both, the temperature and moisture content of the wood substrate to be bonded to control the amount of curing accelerator/catalyst that is added to the thermosetting resin adhesive used to bond the wood substrates together into a wood composite product. The relative proportion of curing accelerator/catalyst that is added to the thermosetting resin adhesive thus is controlled in a continuous manner, responsive to the measured values of wood substrate temperature and/or moisture content, so as, for example, to optimize the property of the resulting wood composite or maximize production speed. The system includes a first (plant) computer that is coupled to a weighing/transporting device for the mat/wood substrate, a thermosetting resin adhesive pump, a thermosetting resin adhesive in-line flow meter and a resin adhesive applicator. A second (accelerator/catalyst) computer senses (continuously measures) the thermosetting resin flow rate from the resin adhesive flow meter output and also incorporates (is in communication with) a mat/wood substrate temperature sensor and/or a mat/wood moisture sensor, a curing accelerator/catalyst pump, a curing accelerator/catalyst flow meter and a flush port control device. As used herein, the term "continuously" and like words and phrases is meant to include not only a strictly continuous activity, but also an intermittent activity which because of the frequency of its repetition approximates the information or result one would obtain from continuous activity. The second computer is used for determining and controlling desired catalyst flows in response to the measured values of temperature and/or moisture content and according to a predetermined temperature-moisture scheme. The second computer also controls the flushing of accelerator/catalyst and thermosetting resin adhesive mixtures from the in-line mixer and delivery piping to the applicator using water or a suitable flushing agent when it senses that no thermosetting resin has been flowing for 30 minutes. The first computer controls operation of the thermosetting resin adhesive pump, the thermosetting resin adhesive applicator, and the movement of the mat/wood substrate in accordance with a predetermined adhesive application scheme. The thermosetting resin adhesive supply provides a supply of resin adhesive, and the thermosetting resin adhesive pump may provide the resin adhesive to the in-line mixer for mixing with the curing accelerator/catalyst or alternatively may provide the resin adhesive directly to the applicator without the addition of accelerant/catalyst. The curing accelerant/catalyst supply provides a supply of curing accelerator/catalyst, and the curing accelerator/catalyst pump provides the curing accelerator/catalyst to the in-line mixer for mixing with the resin adhesive. The in-line mixer mixes the resin adhesive with the curing accelerator/catalyst and sends the mixture to the resin adhesive applicator for applying it to the mat/wood substrate. When selected, the flush port may be used to flush excess mixed resin-curing accelerator/catalyst bonding material from the in-line mixer. The temperature sensor may be used to determine the temperature of the mat/wood substrate, and the moisture sensor may be used to determine the moisture of the mat/wood substrate. The weighing/transporting device may be used for determining the weight of the mat/wood substrate, for controlling the thermosetting resin adhesive pump and for controlling the speed of the conveyor.

DETAILED DESCRIPTION OF THE PREFERRED EMBODIMENTS

Figure 1:
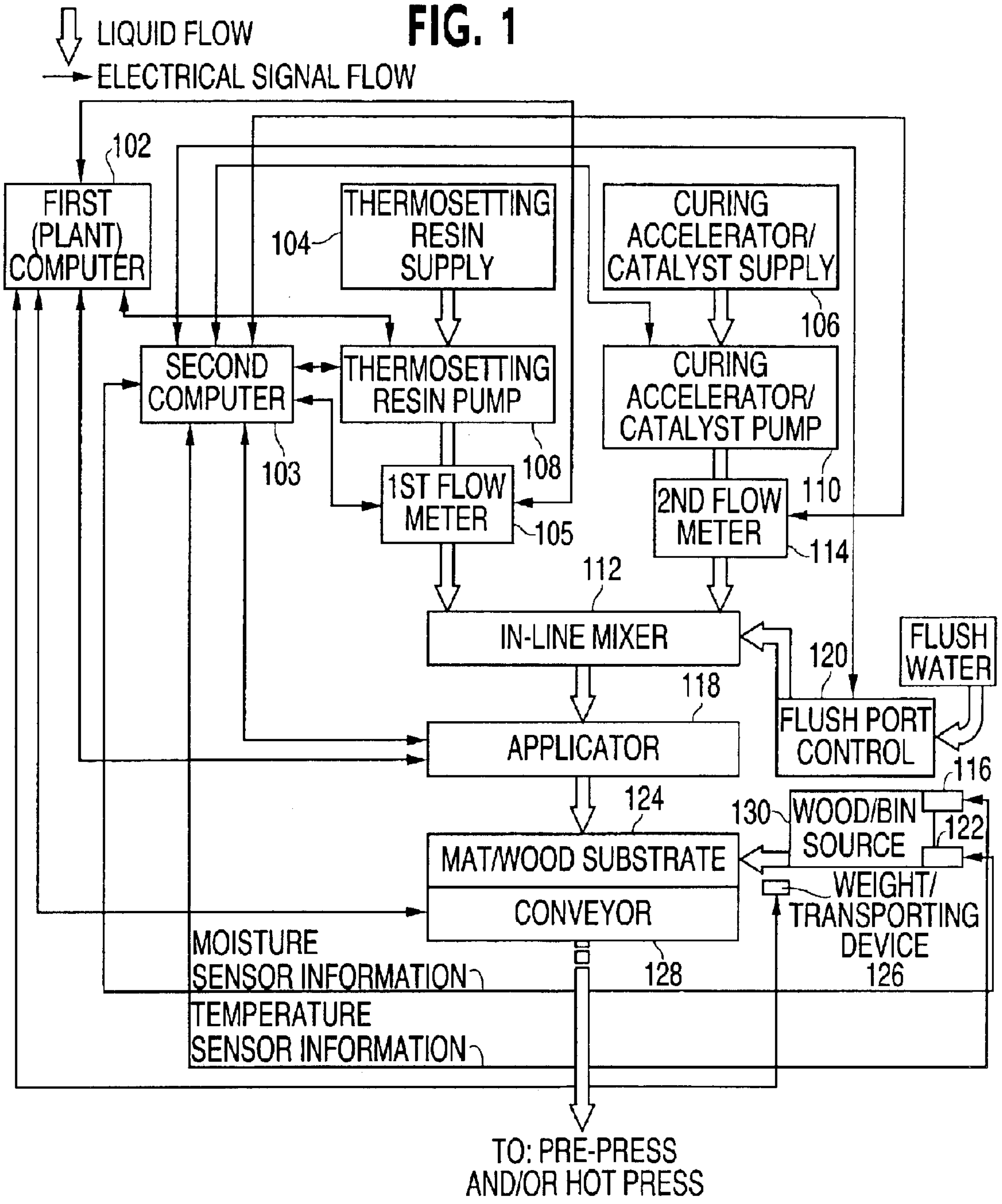
FIG. 1 is a block diagram of one embodiment of elements of a resin adhesive-curing accelerator/agent system that implements dynamic feedback of at least one of: wood substrate moisture content and temperature for in-line (continuous) manufacturing of a wood-based composite in accordance with the present invention.

The present invention provides for dynamically and preferably continuously adjusting the amount of curing accelerator and/or catalyst being added to a thermosetting resin adhesive in an in-line manufacturing process based on a dynamic measuring of at least one of the present moisture content and/or the present temperature of the wood substrate wherein the wood substrate is bonded to form a wood-based composite. A wood-based composite manufactured using the present invention has more uniform, consistent and predictable properties than a wood-based composite manufactured using conventional processes. The wood-based composite product made using the present invention may be more reliably incorporated into building construction, furniture, decorative applications, and the like due to its more uniform appearance and consistent qualities.

A second important aspect of the invention is its utility for controlling the use of a curing accelerator/catalyst in a manner to improve the wood composite product's manufacturing productivity by allowing for the curing of mat/wood substrates having higher moisture at increased throughput speeds, thus increasing product output. By dynamically adjusting the amount of curing accelerator and/or catalyst being added to the thermosetting resin adhesive, wood composites having acceptable properties may be manufactured from furnish, mats, or wood substrates having higher moisture or lower temperatures, thus saving energy costs to dry or raise the temperature of the wood prior to bonding. "Furnish", as used herein, is a processed wood substrate that may include, but is not limited to material used to prepare OSB, wafer board, particle board, hardboard, medium density fiberboard (MDF), plywood, oriented strand lumber, parallel strand lumber, and textile fiber mats (e.g., for ceiling tiles and sound insulation). By changing (increasing) the amount of accelerator/catalyst applied to the thermosetting resin adhesive, the curing rate can be increased which reduces the length of cure, allowing for shorter hot press cycles, thus increasing the productivity throughput. All these factors reduce the overall cost to manufacture the wood composite product.

The accelerated/catalyzed thermosetting resin adhesive mixture is applied to wood substrates by using two component metering and mixing equipment. The in-line metering and mixing equipment of the present invention proportions the accelerator/catalyst and the resin adhesive in the desired quantities on a continuous basis, forces the intermixing of the components through an in-line mixer or by external turbulence mixing, and delivers the mixed catalyzed resin adhesive to the adhesive application area of the wood composite manufacturing system. The resin adhesives selected may be, for example, a phenol-formaldehyde resin (novolac or resole), urea-formaldehyde resin, melamine-urea-formaldehyde resin or any combination thereof along with other polymers to form co-polymer systems. The catalysts or curing accelerants selected are chemical compounds that accelerate the cure or reaction of the resin adhesive. The process includes both the catalysts/accelerants and the means of delivering the catalyzed resin adhesive. For example, catalysts/accelerators may be ammonium sulfate, sodium sulfate, aluminum sulfate, resorcinol-formaldehyde resin, acetone-formaldehyde resin, hexamethylenetetramine, propylene carbonate, carbamates, or any combinations of these, or other known accelerants/catalysts. The equipment meters and mixes the catalyst and/or catalyst/buffer system with the resin adhesive in a calculated proportion which is based on the desired reaction profile of the adhesive, taking into account the measured moisture content and/or measured temperature of the wood or cellulosic substrate to which the adhesive is applied. Sensors located external to the equipment measure, on a more or less continuous basis, the moisture content and/or the temperature of the substrate, and feed the measured data back to the system's computers, which then calculate whether an adjustment to the amount of accelerant/catalyst to be injected into the resin adhesive is needed and executes such modification as required. Data is supplied which shows that changes in the amount of catalyst or catalyst/co-catalyst system affects the gel time, reactivity and cure rate of the resin. The sensors may be radio-frequency type, infrared reflectant type, low power microwave absorbent and reflectant type, or may be those which use direct contact with the wood substrate in which a potential difference is measured between two contact probes or may be an infrared beam type sensor. Any sensor which can more or less continuously monitor the temperature and moisture content of the wood substrate can be used in this invention. The measured temperature and/or measured moisture content are converted to a milli-amp or milli-volt signals which are fed to the computer. In response to these measure values, as represented by the milli-amp or milli-volt signals, the computer software then adjusts the accelerator/catalyst flow rate, or output, as needed to compensate for any changes occurring in the temperature or moisture content measurements.

FIG. 1 is a block diagram of one embodiment of elements of a resin adhesive-curing accelerator/agent system that implements dynamic feedback of at least one of: moisture content or temperature for in-line manufacturing of a wood-based composite in accordance with the present invention. The process of the present invention is applied to the in-line manufacturing of wood-based composites. The process provides for varying the amount of curing accelerator/catalyst being mixed with the thermosetting resin adhesive on the basis of more or less continuous measurements being taken of the present moisture content of the wood substrate being processed, the temperature of the wood substrate being processed, or both. Typical thermosetting resin adhesives include PF, UF and MUF resins. Typical cure accelerators or catalysts include ammonium sulfate, sodium sulfate, aluminum sulfate, resorcinol-formaldehyde, acetone-formaldehyde and the like, as are known to those skilled in the art. Sensors more or less continuously determine the moisture content and/or temperature and provide this feedback information to the in-line manufacturing process to allow a computer to determine the amount of accelerator/catalyst to mix with the adhesive in accordance with a predetermined scheme so that the thermosetting resin adhesive bonds the wood substrate in a more uniform fashion. The resin adhesive-curing accelerator/agent system includes a first (plant) computer 102, electrically coupled to a weighing/transporting device 126, an applicator 118, a thermosetting resin adhesive pump 108, and a first flow meter 105. A second computer 103, also referred to herein as an accelerator/catalyst computer, is used in the resin adhesive-curing accelerator/catalyst system and is connected electrically to the thermosetting resin adhesive pump 108, a first flow meter 105 that indicates the flow rate of resin adhesive from the thermosetting resin adhesive pump 108, a resin adhesive applicator 118 that applies a mixed resin adhesive/accelerator-catalyst mixture to the mat/wood substrate, a temperature sensor 116 that is appropriately coupled to determine a temperature of the particles/flakes/strands/furnish material (wood substrate) for the mat/wood substrate in a wood bin or source 130 that supplies wood for the mat/wood substrate, a moisture sensor 122 that is appropriately coupled to determine a moisture of the wood in particles/flakes/strands/furnish material (wood substrate) for the mat/wood substrate in a wood bin or source 130 that supplies wood for the mat/wood substrate, a flush port control 120, a curing accelerator/catalyst pump 110, and a second flow meter 114 that indicates the flow rate of the accelerator/catalyst from the curing accelerator/catalyst pump 110 to the in-line mixer 112. The in-line mixer 112 may be optional where sufficient mixing is obtained by simply allowing the resin adhesive and accelerator/catalyst to mix in the conduit to the resin adhesive applicator 118. The flush port control 120 is coupled to a source of flush water, and at times selected to prevent setting up of the resin adhesive/accelerant-catalyst mixture, may be used to initiate flushing of the in-line mixer 112 in accordance with signals from the second computer 103.

The second computer 103 determines and controls the desired catalyst flow according to a predetermined temperature and/or moisture scheme. The plant computer 102 controls the operation of the weighing/transporting device 126 for conveying the mat/wood substrate 124 and also weighing the mat/wood substrate and adjusts the speed of the conveyor 128 in accordance with a predetermine resin adhesive application scheme by controlling the thermosetting resin adhesive pump 108, the thermosetting resin adhesive flow meter 105 and the resin adhesive applicator 118.

The system monitors temperature and moisture of the particles/flakes/strands/furnish material for the mat/wood substrate in the wood bin or source 130 using the temperature sensor 116 and the moisture sensor 122. For example, the two sensors may be coupled to the computer 103 using two or three wire cables. Typically, the sensors operate by converting the moisture or temperature reading into a 4 to 20 milliamp signal that is received by the computer 103. Also received by computer 103 are signals from first flow meter 105 as to the flow of thermosetting resin. Preselected computer programs stored in the computer then convert the signal to actual output signals to the curing accelerator/catalyst pump, which typically includes a diverter valve (not shown) so that preset proportions, using a preselected scheme, by weight of the resin and the accelerator/catalyst are pumped into the in-line mixer 112. Generally, predetermined schemes for determining the proportions of resin adhesive and the accelerator/catalyst are stored in the memory (not shown) of the computer. Thus, an operator may, for example, select a desired predetermined scheme, or, alternatively, the system may be preset to operate in an automatic fashion with one or more preselected schemes.

Measurements indicating the present moisture content and the present temperature are typically readings that are converted into milliamp signals that are sent to a computer to determine a percent of curing accelerator/catalyst to be added by weight to the resin adhesive. The signal is converted within the computer to an output signal that is sent to a curing accelerator/catalyst pump having a diverter valve to modify the flow of curing accelerator/catalyst to the resin adhesive. The curing accelerator/catalyst pump 110 then pumps an amount of curing accelerator/catalyst per amount of thermosetting adhesive resin, based on the measurements of the respective flow rates of each stream, that corresponds to the percent addition level determined by the computer 103 into the in-line mixer 112 to be mixed with the computer (102)-selected amount of thermosetting adhesive resin.

For example, the control program for the second computer may be obtained from OPTO22 of Temecula, Calif., which includes the OPTO22 RTU controllers that function with the Cyrano200 software language and include a graphic package called Mistic MMI. Some mills and plants control their various operations, such as flow of the wood source in the bins at the formers which put the furnish on the conveyors, and some plants use a software package called Wonderware®, made by Wonderware Corporation, a division of Invensys plc., located in Irvine, Calif., to control the operation of the various chemical pumps, including the thermosetting resin pump. In the present invention, Hydra Cell pumps may be used. Hydra Cell pumps are high pressure, positive displacement pumps made by Wanner Engineering, Inc. The accelerator/catalyst pump may be a model D-03, while the thermosetting resin pumps are generally a model D-35 or H-25. Flowmeters that are acceptable for use in the present invention are the Micro Motion flow meter, models R-series or DSO25S114SU model mass flow meters. Other flow meters that maybe used for the thermosetting resin include the Johnson Yokogawa magnetic flow meter, model AM102AG or the magnetic flow meter model 110D1475Y made by Bailey-Fischer & Porter Company of Warminster, Pa. Moisture sensors that may be used include Model St-2200 Series online moisture analyzer from Sensortech Systems in Santa Clarita, Calif. This moisture sensor is a Near Infrared Reflectance instrument. Another company that provides similar moisture sensors is Kernco Instruments of El Paso, Tex. Temperature may be measured by an infrared temperature sensor such as a model OS36-1 or a direct contact probe such as a model SICSS, iron constantan, stainless steel probe, both of which are available from Omega Engineering, Inc.

Figure 2:
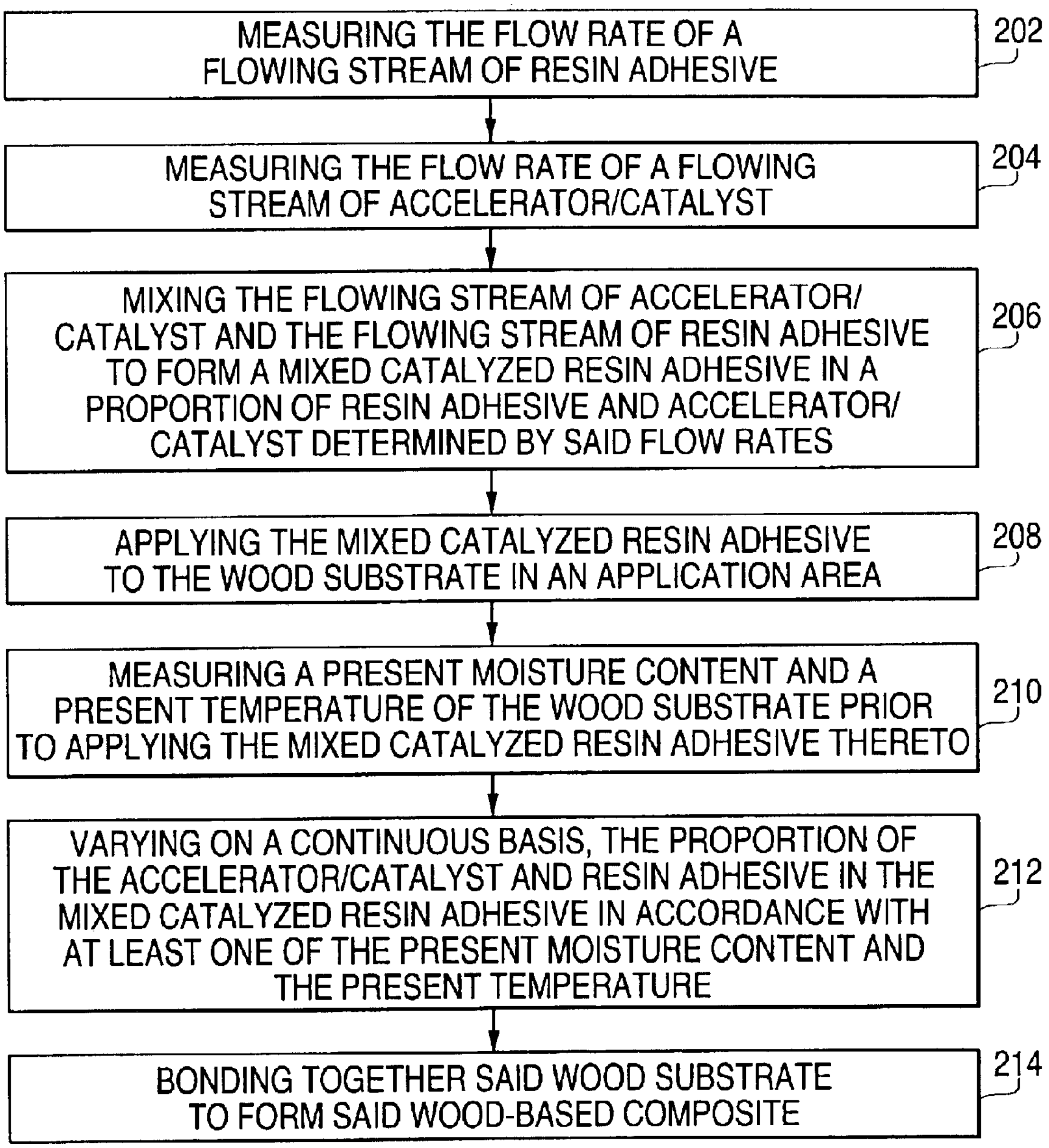
FIG. 2 is a flow chart of one embodiment of steps of a method in accordance with the present invention.

FIG. 2 is a flow chart of one embodiment of steps of a method in accordance with the present invention. The method includes: measuring 202 the flow rate of a flowing stream of resin adhesive; measuring 204 the flow rate of a flowing stream of accelerator/catalyst; mixing 206 the flowing stream of accelerator/catalyst and the flowing stream of resin adhesive to form a mixed catalyzed resin adhesive in a proportion of resin adhesive and accelerator/catalyst determined by said flow rates; applying 208 the mixed catalyzed resin adhesive to the wood substrate in a resin adhesive application area; measuring 210 a present moisture content and a present temperature of the wood substrate prior to applying the mixed catalyzed resin adhesive thereto; varying 212 on a more or less continuous basis, the relative proportions of the accelerator/catalyst and the resin adhesive in the mixed catalyzed resin adhesive in accordance with (as a function of) at least one of the measurements of present moisture content and of the present temperature; and bonding 214 together said wood substrate to form said wood-based composite.

Figure 3:
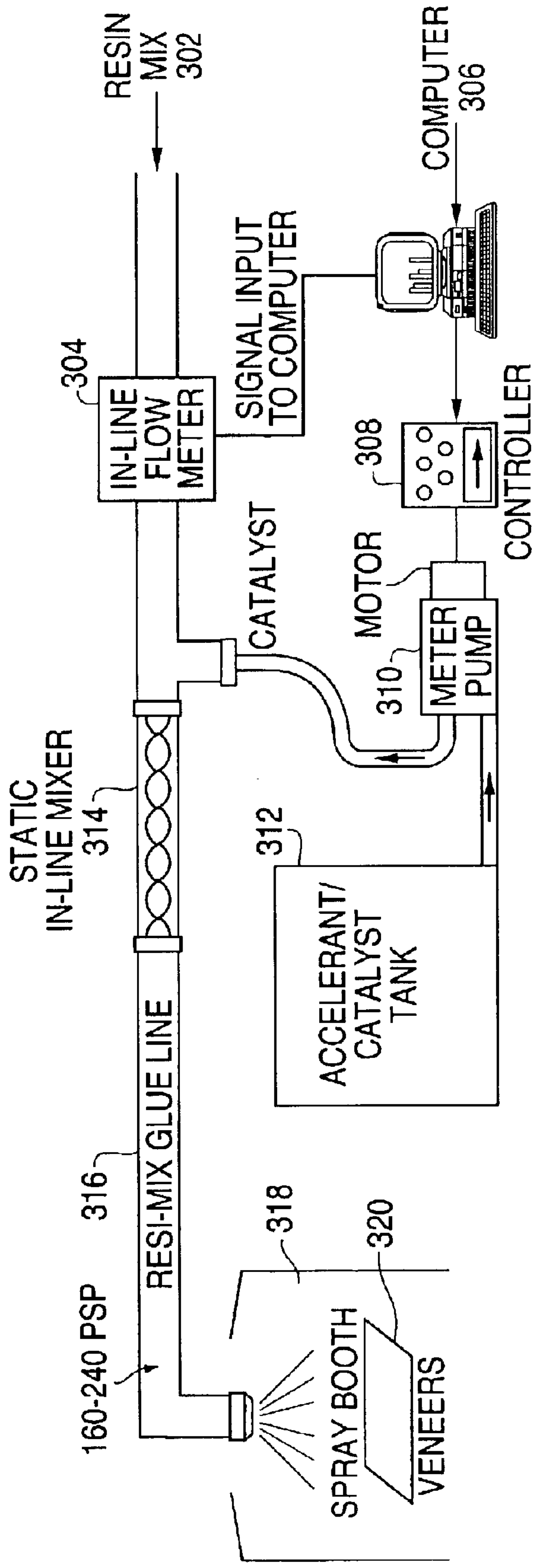
FIG. 3 is a schematic representation of one embodiment of a system for implementing dynamic feedback of at least one of: wood substrate moisture content and temperature for in-line manufacturing of a wood-based composite in accordance with the present invention.

FIG. 3 is a schematic representation of one embodiment of a system for implementing dynamic feedback of at least one of moisture content and temperature of the wood substrate for in-line manufacturing of a wood-based composite in accordance with the present invention. The resin adhesive 302 is input to an in-line flow meter 304, which measures the flow rate of resin adhesive and sends a signal input to the computer 306 proportional to the flow rate. The computer 306 is coupled to a controller that is electronically coupled to pump 310 that pumps a computed amount of accelerant/catalyst from a supply tank 312 to a static in-line mixer 314 (optional). The mixed adhesive resin is piped through a resin-mix glue line 316 to a spray booth 318 for spraying onto a wood-based veneer 320.

Figure 4:
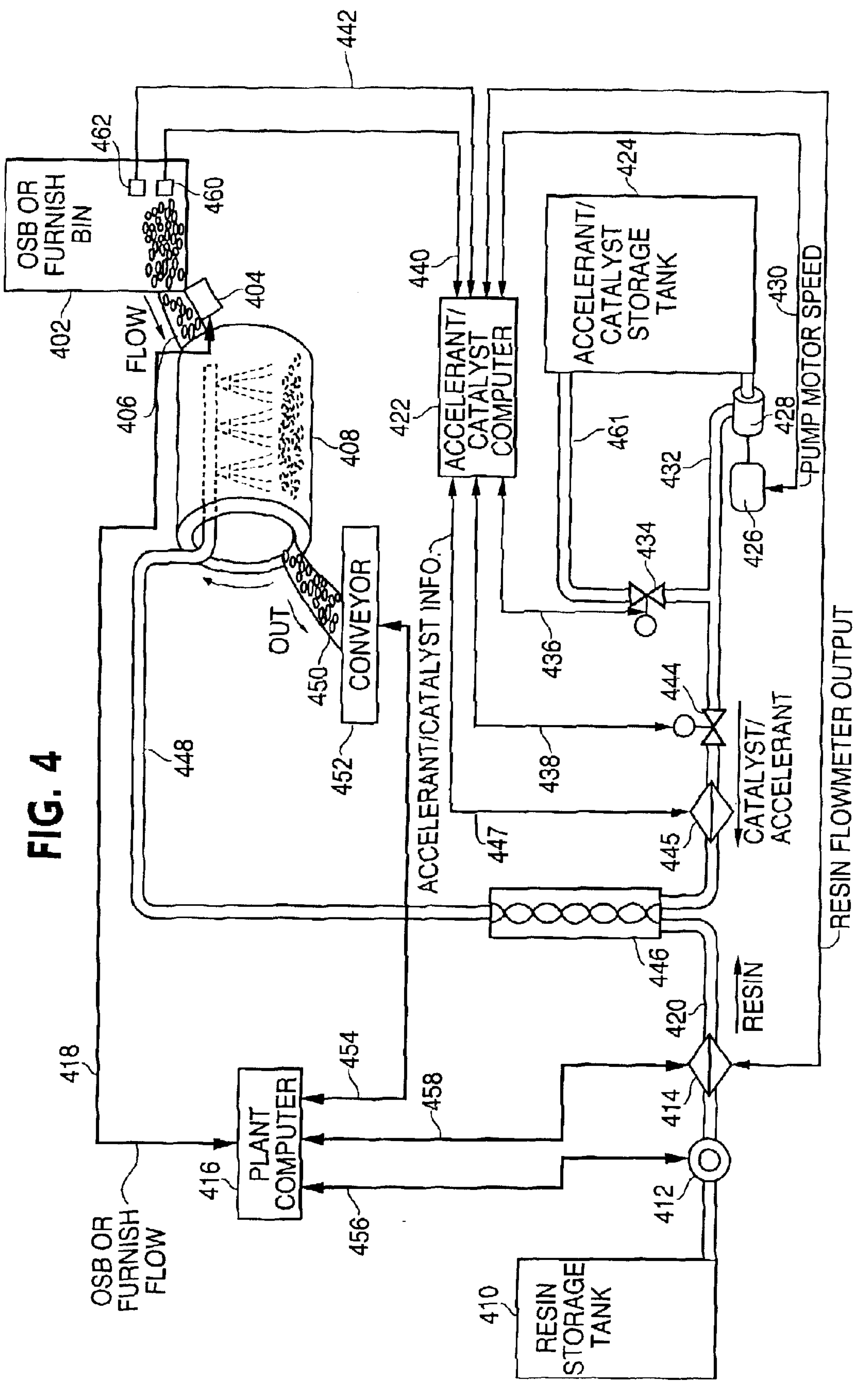
FIG. 4 is a schematic representation of another embodiment of a system for implementing dynamic feedback of at least one of: wood substrate moisture content and temperature for in-line manufacturing of a wood-based composite in accordance with the present invention.

FIG. 4 is a schematic representation of another embodiment of a system for implementing dynamic feedback of at least one of moisture content and temperature of wood substrate for in-line manufacturing of a wood-based composite in accordance with the present invention. An OSB flake/furnish particle bin 402 supplies OSB flake or other furnish particles to a first conduit 406 where a weigher 404 weighs the input particles (and generates a signal proportional to the weight) to be processed and sends them to a rotating blender 408 where the particles and a mixture of accelerant/catalyst and resin adhesive are blended and the output 450 is distributed onto a conveyor 452. A resin adhesive storage tank 410 supplies the thermosetting resin adhesive to a first pump 412, which outputs the resin adhesive through a first flow meter 414, which is electrically coupled to the plant computer 416 and to the accelerant/catalyst computer 422. The first flow meter 414 provides the resin adhesive flow output through a resin adhesive conduit line 420 to the in-line mixer 446 and the resin adhesive flow rate output is controlled by the plant computer 416.

The plant computer 416 is electrically coupled 456, 458, 418, 454 to the pump 412, the first flow meter 414, the weigher 404 and a conveyor 452, respectively, to control the flow of resin adhesive and wood particles to be blended in the rotating blender 408 and to control the speed of the conveyor 452 receiving the output from the blender. An accelerant/catalyst storage tank 424 supplies the accelerant/catalyst to a second pump 428 which is operated using a motor 426 electrically coupled to an accelerant/catalyst computer 422. The accelerant/catalyst flows through a second conduit 432 that is coupled to a recirculation return line 461 via a first diverter valve 434 that is electrically coupled 436 to provide a signal indicative of the accelerant/catalyst pressure at the first diverter valve 434 to the accelerant/catalyst computer 422.

The accelerant/catalyst computer 422 is electrically coupled to a second diverter valve 444, to the first diverter valve 434, to the motor 426 and to the flow meter 414. The first diverter valve 434 opens for recirculation of the accelerant/catalyst so that there is always an accelerant/catalyst flow. The first diverter valve 434 closes to raise the pressure to exceed the pressure in the thermosetting resin adhesive line. Not shown are pressure transducers in the thermosetting resin adhesive lines and accelerant/catalyst lines that are used to measure the liquid pressures since such transducers are known in the art.

As the second diverter valve 444 opens to allow the flow of the accelerant/catalyst into the in-line mixer 446, the flow is measured by the second flow meter 445. The second computer, which is electrically coupled 447 to the second flow meter 445, senses the input from the second flow meter 445 and either increases or decreases the second diverter valve 444 opening and/or increases or decreases the second pump speed 428 in accordance with a predetermined scheme to obtain a desired flow of accelerant/catalyst.

Generally, as a safety precaution, the equipment automatically shuts down if the pressure exceeds a preset level. Also, to insure that there is no flow back into the second pump 428 via the second diverter valve 444, the speed of the second pump 428 increases and the first diverter valve 434 acts as a pressure diverter valve, closing to raise the accelerant/catalyst pressure to a value slightly higher than the pressure of the thermosetting resin adhesive pressure, for example, 50 psi over the thermosetting resin adhesive pressure. Check valves are also typically in place (not shown) to prevent flow of the accelerant/catalyst into the resin adhesive conduit line 420 or flow of resin adhesive into the accelerant/catalyst conduit line 432 at the in-line mixer 446.

In one embodiment, the second pump 428, motor 426, the first diverter valve 434, the second diverter valve 444, and the accelerant/catalyst computer 422 may be placed on an independent cart to allow ready mobility of the system.

The accelerator/catalyst computer 422 is further coupled to receive moisture detector information 440 from a moisture sensor 460 in the OSB flake/furnish particle bin 402 and temperature detector information 442 from the temperature sensor 462 in the OSB flake/furnish particle bin 402. The second conduit 432 is further coupled to a second diverter valve 444 that is electrically coupled 438 to the accelerant/catalyst computer 422 and diverts the accelerant/catalyst to the in-line mixer 446 in accordance with electrical signals from the accelerant/catalyst computer 422. The resin and accelerant/catalyst are mixed as they pass through the in-line mixer 446, as is known in the art. A spray line 448 carries the mixed resin adhesive and accelerant/catalyst from the in-line mixer 446 to the rotating blender 408.

The invention's system has the capability of adding accelerant/catalyst to both low and high pressure adhesive systems. The low pressure capability is for foam and curtain coating, while the high pressure is generally associated with spray booth applications.

The optional operator's cart may be implemented as, for example, a nine to ten square foot cart with a control panel which may be folded down for transportation and may have selector switches, readouts and the like for the operator. The pumps generally are stainless steel and have the capability to meter accurately corrosive accelerants/catalysts at rates of 40 to 400 milliliters per minute and at pressures of 20 to 300 psi. In another embodiment, the metering pump may have twice the output, but still has the accuracy at the lower flow rates. All lines and accessories are typically stainless steel or high pressure chemical resistant hose. The catalyst is generally supplied in a stainless steel five gallon "run" container with a bottom feed and with return lines at the top. Optionally, the system may include an automatic refill system fed from drums of accelerant/catalyst for extended mill runs or the accelerant/catalyst may be supplied from 300 gallon totes or a storage tank. The motor typically has an AC variable speed motor, 440 to 480 volts, 3 phase with a programmable controller such as a PLC, and has the capability to be linked to a personal computer.

For low pressure applications, most of the equipment remains the same, but the accelerator/catalyst injection section may be different, depending on which application is desired. For the foam application, the accelerator/catalyst is injected into the line between the micro-motion meter and the foamer, allowing the foamer to do the catalyst mixing.

Schemes for determining an amount of curing accelerator/catalyst to be added to the thermosetting resin adhesive as a function of, for example, the type of wood-composite being bonded, the thermosetting resin adhesive being utilized, the curing accelerator or catalyst used, the range of moisture content of the wood substrate within which the bonding process is effective, and the temperature range within which the performance of the bonding process is maximized or optimized. A plurality of examples of schemes for catalyzation/acceleration of thermosetting resins adhesives is set forth below.

EXAMPLE 1

Where the moisture content is being measured for plywood during the bonding process, phenolic thermosetting resins adhesives are used, and an acetone-formaldehyde resin is used as the catalyst/curing accelerator, typically, for a wood substrate (plywood veneer) moisture range of seven to fifteen percent, the predetermined temperature-moisture scheme may be based entirely upon the moisture content of the plywood. Here, the percent catalyst/curing accelerator is determined using an equation substantially of a form:

$$\text{percent catalyst/accelerator} = -13.3476 + 2.65238 \times M - 0.0887446 \times M^2,$$

where M is the percent moisture content of the plywood expressed as a percentage.

Percent catalyst refers to the percent, by weight, of the catalyst/accelerator to mix with the resin adhesive.

EXAMPLE 2

Where the temperature is being measured for plywood during the bonding process, phenolic thermosetting resins are implemented, and an acetone-formaldehyde resin is being used as the catalyst/curing accelerator, typically, where the plywood temperature is in a range of 60 to 160 degrees Fahrenheit, the predetermined temperature-moisture scheme may be based entirely upon the temperature of the plywood. Here, the percent catalyst/curing accelerator is determined using an equation substantially of a form:

$$\text{percent catalyst/accelerator}=8.17063-0.0115268\times T-0.000238928\times T^2,$$

where T is the temperature of the plywood expressed in Fahrenheit degrees.

EXAMPLE 3

Where the moisture content is being measured for oriented strandboard furnish during the bonding process, phenolic thermosetting resin adhesives are implemented, and resorcinol-formaldehyde resin is being used as the catalyst/curing accelerator, and where the OSB furnish has a moisture range of seven and one half to twelve percent, the predetermined temperature-moisture scheme may be based entirely upon the moisture content of the OSB. Here, the percent catalyst/curing accelerator is determined using an equation substantially of a form:

$$\text{percent catalyst/accelerator}=-0.336364-1.22051\times M+0.177156\times M^2,$$

where M is the percent moisture content of the OSB furnish expressed as a percentage.

EXAMPLE 4

In this example, the OSB furnish has a temperature range of 60–120° F. Where phenolic thermosetting resin adhesives are implemented, and resorcinol-formaldehyde resin is being used as the catalyst/curing accelerator, the predetermined temperature-moisture scheme may be based entirely upon the temperature of the OSB furnish. Here, the percent catalyst/curing accelerator is determined using an equation substantially of a form:

$$\text{percent catalyst}=16.0595-0.275\times T+0.00119048\times T^2$$

where T is the temperature of the OSB furnish expressed in Fahrenheit degrees.

EXAMPLE 5

Here, the wood-based composite is medium density fiberboard (MDF) furnish and the moisture range being measured during the bonding process is from four to sixteen percent. Where, urea-formaldehyde thermosetting resin adhesives are implemented and a thirty percent by weight aqueous solution of ammonium sulfate is being used as the catalyst/curing accelerator, the predetermined temperature-moisture scheme may be based entirely upon the moisture content of the MDF furnish. Here, the percent catalyst/curing accelerator is determined using an equation substantially of a form:

$$\text{percent catalyst/accelerator}=0.703946+0.10979\times M--0.00004995\times M^2,$$

where M is the percent moisture content of the MDF furnish expressed as a percentage.

EXAMPLE 6

In this example, the MDF furnish has a temperature range of 55–115° F. Where the temperature is being measured for MDF furnish during the bonding process, urea-formaldehyde thermosetting resin adhesives are implemented, and a thirty percent by weight aqueous solution of ammonium sulfate is being used as the catalyst/curing accelerator, the predetermined temperature-moisture scheme may be based entirely upon the temperature of the MDF furnish. Here, the percent catalyst/curing accelerator is determined using an equation substantially of a form:

$$\text{percent catalyst/accelerator}=3.78022-0.0232967\times T+0.0\times T^2,$$

where T is the temperature of the MDF furnish expressed in Fahrenheit degrees.

EXAMPLE 7

In this example, the wood-composite material is particleboard furnish, and the moisture range during processing ranges from three to fifteen percent. Where urea-formaldehyde thermosetting resin adhesives are implemented, and a thirty percent by weight aqueous solution of ammonium sulfate is being used as the catalyst/curing accelerator, the predetermined temperature-moisture scheme may be based entirely upon the moisture content of the particleboard furnish. Here, the percent catalyst/curing accelerator is determined using an equation substantially of a form:

$$\text{percent catalyst/accelerator}=0.826124+0.102572\times M+0.000574426\times M^2,$$

where M is the percent moisture content of the particleboard furnish expressed as a percentage.

EXAMPLE 8

In this example, the particleboard furnish has a temperature range of 60–110° F. Where urea-formaldehyde thermosetting resin adhesives are implemented and a thirty percent by weight aqueous solution of ammonium sulfate is being used as the catalyst/curing accelerator, the predetermined temperature-moisture scheme may be based entirely upon the temperature of the particleboard furnish. Here, the percent catalyst/curing accelerator is determined using an equation substantially of a form:

$$\text{percent catalyst/accelerator}=4.33804-0.0319627\times T+0.00002331\times T^2,$$

where T is the temperature of the particleboard furnish expressed in Fahrenheit degrees.

One approach where the percentage of curing accelerator/catalyst to mix with the thermosetting resin adhesive is determined based on measurements of both the present moisture content and the present temperature involves preselecting a weighting factor to apply to the calculations performed on the basis of the measured temperature and the measured moisture content. For example, if an operator or computer program pre-selects the present moisture as having the dominant influence on the wood-composite product, then the operator/computer program selects a desired percent of the percent curing accelerator/catalyst to be determined using the present moisture content (e.g. 70%) and the remaining percent of curing accelerator/catalyst (e.g. 30%) is assigned proportionally to the percent catalyst/accelerator determined using the present temperature measurement. For example in making a wood composite using particleboard furnish where the present moisture content (varying between 3–15%) is the dominant influence (e.g. 65%) and the present temperature (varying between 60–110° F.) is the lesser influence (e.g. 35%), then the percent catalyst/curing accelerator for mixing with the resin adhesive may be determined using an equation substantially of a form $$\text{percent catalyst/accelerator}=(0.65)[0.826124+0.102572\times M+0.000574426\times M^2]+(0.35)[4.33804-0.0319627\times T+0.00002331\times T^2]$$

where T is the temperature of the particleboard furnish expressed in Fahrenheit degrees and M is the percent moisture content of the particleboard furnish expressed as a percentage.

Similarly, where percent catalyst/accelerator is determined based on a measurement of both the present moisture content and the present temperature, and an operator or computer program selects the present temperature as the dominant influence on the wood-composite product, then the operator/computer program selects a desired percent of the percent curing accelerator/catalyst to be determined using the present moisture content (e.g. 70%) and the remaining percent of curing accelerator/catalyst (e.g. 30%) is assigned proportionally to the percent catalyst/accelerator determined using the present temperature. Such a proportioning procedure may be referred to as a master formulation procedure which specifies a total amount of curing accelerator/catalyst to be injected into the thermosetting resin adhesive in an in-line manufacturing process to be a percentage of the curing accelerator/catalyst from a moisture scheme and a percentage of a temperature scheme. These percentages may be selected to be variable, and thus may be selectable and input by an operator into the computer control system. Alternatively, desired alternatives may be set forth in computer programs that are activated when predetermined conditions are met. Thus, for example, if the effect of moisture appears to be having a greater effect on the optimum amount on the curing accelerator/catalyst to blend with the resin adhesive for obtaining a desired effect than does the effect of the temperature, then the operator may select sixty to seventy percent of the amount determined using the moisture calculation and the remaining thirty to forty percent would be determined using the temperature calculation.

Clearly, other curing accelerators/catalysts may be used in a fashion similar to the ones described above. Also, other thermosetting resin adhesives may be used. The above examples are set forth to demonstrate some of the implementations of bonding adhesives and curing accelerators/catalysts. The present invention provides for more or less continuous measurement of at least one of present moisture and present temperature of the wood substrate, which measurements are utilized to adjust the percent by weight of curing accelerant/catalyst that is mixed with the thermosetting resin in order to optimize the desired characteristics of the wood-based composite product.

A wide variety of wood-based composites may be bonded utilizing the present invention. For example, the wood-based composite may be: plywood, laminated veneer lumber, parallel-laminated veneer, a laminated beam, an overlaid material, a wood-nonwood composite, a cellulosic fiberboard, hardboard, particleboard, waferboard, flakeboard, oriented strandboard, and an edge-glued wood-based composite material. The present moisture content and the present temperature are typically measured using moisture sensor and temperature sensor devices.

Although the present invention has been described in relation to particular preferred embodiments thereof, many variations, equivalents, modifications and other uses will become apparent to those skilled in the art. The present invention is intended to cover any variations, equivalents, modifications and other such uses that follow the principles of the invention, including such departures from the present disclosure as come within known and customary practice within the art to which the invention pertains. It is preferred, therefore, that the present invention be limited not by the specific disclosure herein, but only by the appended claims, and that the present invention shall include any variations, equivalents, modifications and other such uses that follow the principles of the invention, including such departures from the present disclosure as come within known and customary practice within the art to which the invention pertains.

What is claimed is:

1. A system for feedback adjusted in-line addition of a curing accelerator/catalyst to a thermosetting resin adhesive used to adhesively bond furnish material in a wood substrate to form a wood-based composite, comprising:

a first computer electrically coupled to an applicator, a thermosetting resin pump, a first flow meter and a conveyor; and a second computer electrically coupled to the thermosetting resin pump, the first flow meter, the applicator, a temperature sensor, a moisture sensor, a flush port control, a curing accelerator/catalyst pump, and a second flow meter wherein:

the first computer is configured for adjusting a speed of the conveyor in accordance with a predetermined adhesive application scheme, the conveyor conveys the wood substrate, the first flow meter indicates a flow rate of resin from the thermosetting resin pump, the applicator applies a resin and curing accelerator/catalyst mixture to the wood substrate, the temperature sensor determines a temperature of furnish material in a wood source supplying furnish material for the wood substrate, the moisture sensor determines a moisture of furnish material in the wood source, the flush port control initiates flushing of an in-line mixer, the second flow meter indicates a flow rate of the curing accelerator/catalyst from the curing accelerator/catalyst pump to one of a conduit to the applicator and the in-line mixer, and the second computer determines and controls curing accelerant/catalyst flows according to a predetermined temperature-moisture scheme by monitoring temperature and moisture of the furnish material in the wood source and inputting measurements of the temperature and moisture to the predetermined temperature-moisture scheme for adjusting curing accelerant/catalyst input.

2. The system of claim 1 wherein the second computer is configured to determine and control curing accelerator/catalyst flows according to a predetermined temperature-moisture scheme for a wood-based composite chosen from one of: plywood, laminated veneer lumber, parallel-laminated veneer, a laminated beam, an overlaid material, a wood-nonwood composite, a cellulosic fiberboard, hardboard, particleboard, waferboard, flakeboard, oriented strandboard, and an edge-glued wood-based composite material.

3. The system of claim 1 wherein:

the moisture determined by the moisture sensor and the temperature determined by the temperature sensor are converted into milliamp or millivolt signals that are sent to the second computer, the second computer determines a percent of curing accelerator/catalyst to be added by weight to the resin, the percent of curing accelerator/catalyst is converted to an output signal that is sent to the curing accelerator/catalyst pump, the curing accelerator/catalyst pump transfers to the in-line mixer an amount of the curing accelerator/catalyst corresponding to the percent of curing accelerator/catalyst.

4. The system of claim 1 wherein the second computer is configured to determine and control curing accelerator/catalyst flows according to a predetermined temperature-moisture scheme for plywood under which, for phenolic resins and acetone formaldehyde catalyst/accelerator and a substrate temperature (T) range of 60–160° F., a percent catalyst/accelerator is determined using an equation substantially of a form:

$$\text{percent catalyst/accelerator}=8.17063-0.0115268\times T-0.000238928\times T^2,$$

where T is the temperature of the plywood expressed in Fahrenheit degrees.

5. The system of claim 1 wherein the second computer is configured to determine and control curing accelerator/catalyst flows according to a predetermined temperature-moisture scheme for oriented strandboard furnish under which, for phenolic resins and resorcinol formaldehyde catalyst/accelerator and a temperature (T) range of 60–120° F., a percent catalyst/accelerator is determined using an equation substantially of a form:

$$\text{percent accelerator/catalyst}=16.0595-0.275\times T+0.00119048\times T^2,$$

where T is the temperature of the oriented strandboard furnish expressed in Fahrenheit degrees.

6. The system of claim 1 wherein the second computer is configured to determine and control curing accelerator/catalyst flows according to a predetermined temperature-moisture scheme for medium density fiberboard furnish under which, for urea formaldehyde resins and a thirty percent ammonium sulfate catalyst/accelerator and a substrate temperature (T) range of 55–115° F., a percent catalyst/accelerator is determined using an equation substantially of a form:

$$\text{percent catalyst/accelerator}=3.78022-0.0232967\times T+0.0\times T^2,$$

where T is the temperature of the medium density fiberboard furnish expressed in Fahrenheit degrees.

7. The system of claim 1 wherein the second computer is configured to determine and control curing accelerator/catalyst flows according to a predetermined temperature-moisture scheme for particleboard furnish under which, for urea formaldehyde resins and a thirty percent ammonium sulfate catalyst/accelerator and a substrate temperature (T) range of 60–110° F., a percent catalyst/accelerator is determined using an equation substantially of a form:

$$\text{percent catalyst/accelerator}=4.33804-0.0319627\times T+0.00002331\times T^2,$$

where T is the temperature of the particleboard furnish expressed in Fahrenheit degrees.

8. The system of claim 1 wherein the second computer determines and controls curing accelerator/catalyst flows according to a predetermined temperature-moisture scheme in which a percent of accelerator/catalyst is determined using a moisture determined by the moisture sensor and a remaining percent of accelerator/catalyst is determined using a temperature determined by the temperature sensor.

9. The system of claim 1 wherein the second computer determines and controls curing accelerator/catalyst flows according to a predetermined temperature-moisture scheme in which a percent of accelerator/catalyst is determined using a temperature determined by the temperature sensor and a remaining percent of accelerator/catalyst is determined using a moisture determined by the moisture sensor.

* * * * *

UNITED STATES PATENT AND TRADEMARK OFFICE

CERTIFICATE OF CORRECTION

PATENT NO. : 6,886,618 B2
DATED : May 3, 2005
INVENTOR(S) : Millard E. Foucht et al.

It is certified that error appears in the above-identified patent and that said Letters Patent is hereby corrected as shown below:

Column 13,
Lines 53-54, please replace "--0.00004995x$M^2$," with -- -0.00004995x$M^2$, --.

Signed and Sealed this

Thirtieth Day of August, 2005

JON W. DUDAS
*Director of the United States Patent and Trademark Office*